United States Patent [19]

Okamoto et al.

[11] 4,326,294

[45] Apr. 20, 1982

[54] SPACE DIVERSITY RECEPTION SYSTEM HAVING COMPENSATION MEANS OF MULTIPATH EFFECT

[75] Inventors: Yoshiharu Okamoto, Yokosuka; Izumi Horikawa, Yokohama; Shozo Komaki, Yokosuka, all of Japan

[73] Assignee: Nippon Telegraph & Telephone Public Corporation, Tokyo, Japan

[21] Appl. No.: 113,591

[22] Filed: Jan. 21, 1980

[30] Foreign Application Priority Data

| Feb. 13, 1979 | [JP] | Japan | 54-14359 |
| Mar. 28, 1979 | [JP] | Japan | 54-35643 |
| Apr. 4, 1979 | [JP] | Japan | 54-39743 |
| Nov. 19, 1979 | [JP] | Japan | 54-148867 |

[51] Int. Cl.³ .................................................. H04B 7/08
[52] U.S. Cl. ................................. 455/139; 455/273; 455/275; 455/276; 455/278
[58] Field of Search .............. 455/52, 137, 138, 139, 455/272, 273, 276, 278, 304, 275

[56] References Cited

U.S. PATENT DOCUMENTS

| 1,794,418 | 3/1931 | Potter | 455/273 |
| 2,505,266 | 4/1950 | Villem | 455/63 |
| 2,860,238 | 11/1958 | Dyke et al. | 455/276 |
| 3,036,301 | 5/1962 | Wiesner | 455/273 |
| 4,079,318 | 3/1978 | Kinoshita | 455/276 |
| 4,232,399 | 11/1980 | Heiter | 455/276 |

FOREIGN PATENT DOCUMENTS 810698   3/1959   United Kingdom ............... 455/273

Primary Examiner—Marc E. Bookbinder
Attorney, Agent, or Firm—Armstrong, Nikaido, Marmelstein & Kubovcik

[57] ABSTRACT

A space diversity reception system which minimizes the inband amplitude and/or phase dispersion by controlling the phase shifter is described. According to the present invention, the interference waves in the two antenna outputs are combined in anti-phase condition. The phase shifter control direction is decided by the sign of the two parameters. One of them is difference between two antenna levels at the center frequency of the pass-band, and the other is the difference of the combined signal levels at the extreme edges of the pass-band. The control means comprises four detectors for detecting said levels, two subtractors for providing said level difference between them, and the control circuit for deciding the phase shifter control direction.

12 Claims, 40 Drawing Figures

Fig. 5

| DIRECTION OF CONTROL OF PHASE SHIFTER | | DEVIATION IN PASSBAND $\|\dot{X}_S(\omega_0+\Delta\omega)\|-\|\dot{X}_S(\omega_0-\Delta\omega)\|$ | |
|---|---|---|---|
| | | $\|\dot{X}_S(\omega_0+\Delta\omega)\|-\|\dot{X}_S(\omega_0-\Delta\omega)\|<0$ | $\|\dot{X}_S(\omega_0+\Delta\omega)\|-\|\dot{X}_S(\omega_0-\Delta\omega)\|>0$ |
| LEVEL DIFFERENCE BETWEEN ANTENNAS $R_2(\omega_0)-R_1(\omega_0)$ | $R_2(\omega_0) > R_1(\omega_0)$ | + | − |
| | $R_2(\omega_0) < R_1(\omega_0)$ | − | + |

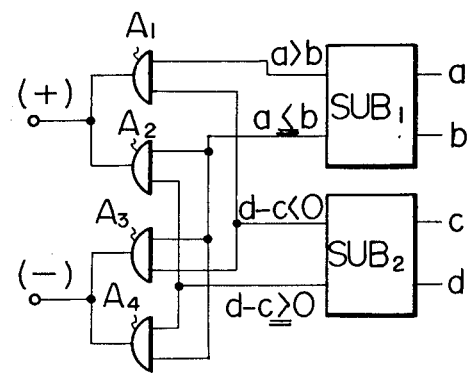

Fig. 7

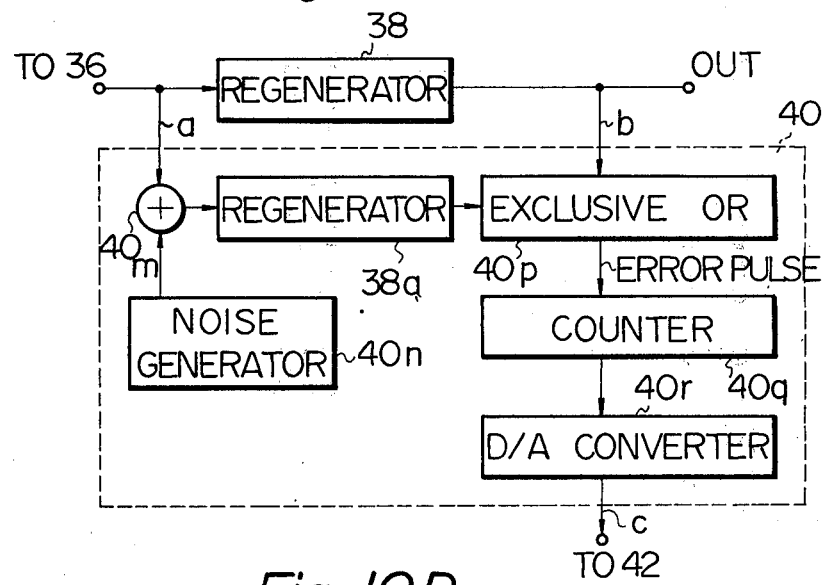
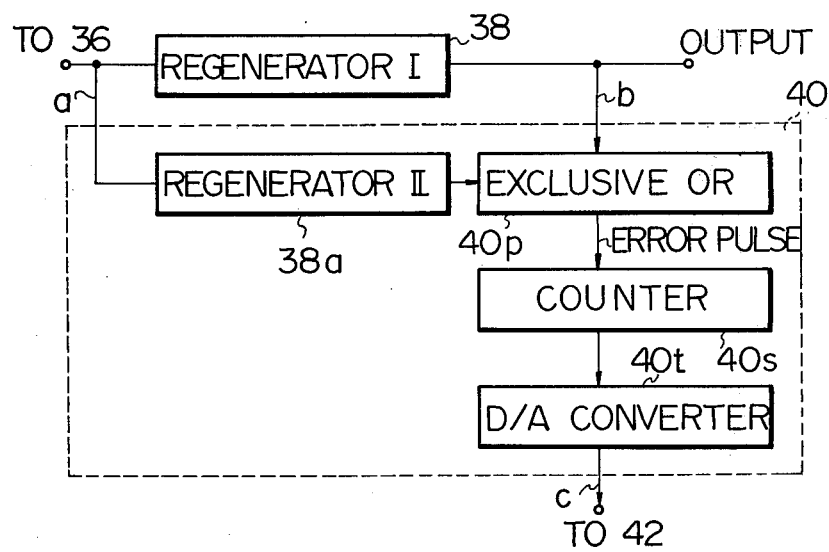

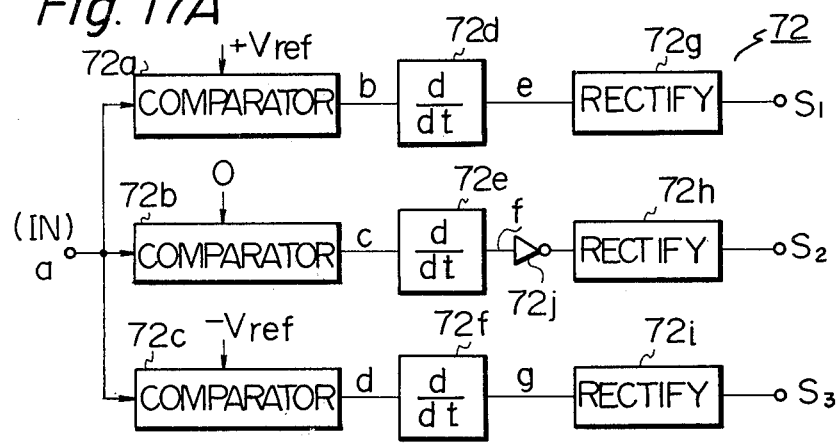
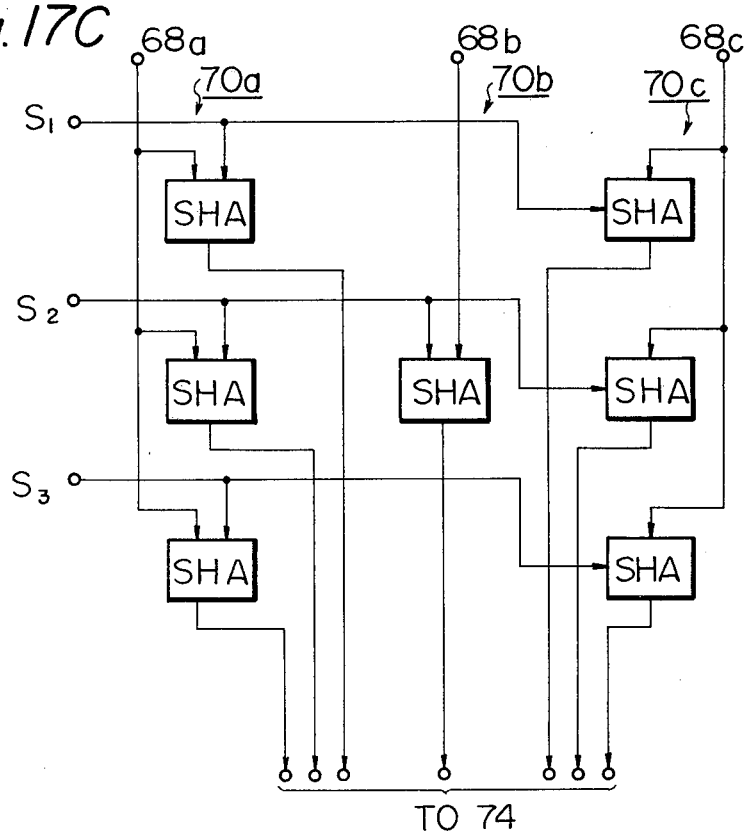

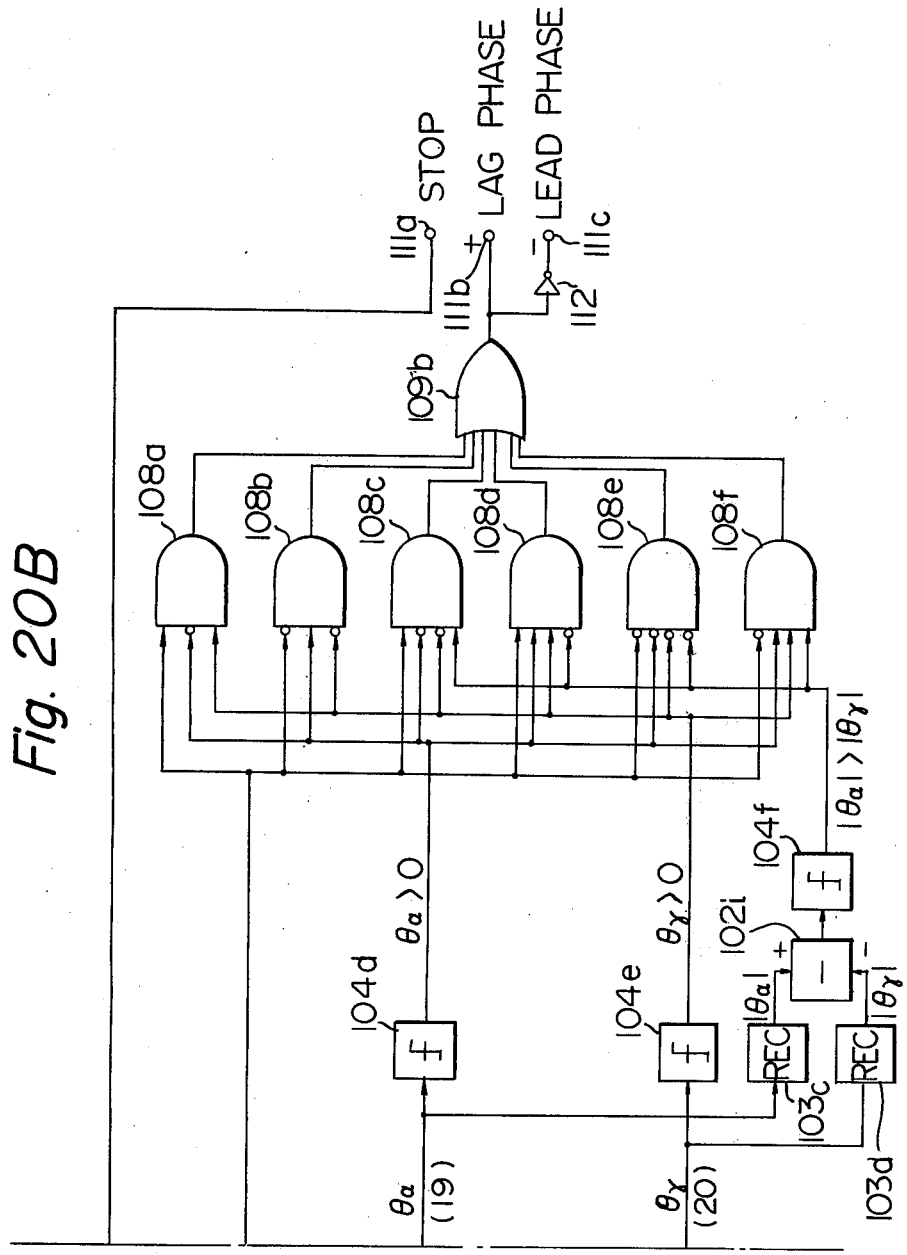

SPACE DIVERSITY RECEPTION SYSTEM HAVING COMPENSATION MEANS OF MULTIPATH EFFECT

BACKGROUND OF THE INVENTION

The present invention relates to a space diversity reception system, in particular, relates to such a system which can reduce the amplitude dispersion and the delay dispersion caused by the frequency selective fading within the pass-band.

In a microwave FM (frequency modulation) circuit, a microwave from the transmission antenna $ANT_1$ which is connected to the transmitter TX reaches the reception antenna $ANT_2$ which is connected to the receiver RX through at least a direct path $P_1$ and an indirect path $P_2$ (see FIG. 1). The microwave through an indirect path is called an interference wave, and the phase between the direct wave and the interference wave changes at random. Supposing that the direct wave is $A_0=a_0 \sin \omega t$, and the interference wave is $A_1=a_1 \sin \omega(t-\tau)$, then, the attenuation of the combined wave is up to $20 \log (1/(1-\psi))$(dB), (where $\psi=a_1/a_0$).

In order to combat said attenuation, a space diversity system which combines two signals received by a plurality of spaced antennas with inphase has been used.

FIG. 2 shows the block diagram of a prior diversity system, and FIGS. 3A, 3B and 3C show the operation of a prior diversity system.

In FIG. 2, the reference numeral 1 is the first antenna, 2 is the second antenna, 3 is a phase shifter, and 4 is a combiner. Supposing that the antenna 1 receives the main wave $M_1$ and the interference wave $I_1$ with the phase difference as shown in FIG. 3A, then, the reception power $C_1$ is the vector sum of said $M_1$ and $I_1$ as shown in FIG. 3A. Similarly, supposing that the second antenna 2 receives the main wave $M_2$ and the interference wave $I_2$ with the phase difference as shown in FIG. 3A, then the reception power $C_2$ is the vector sum of said $M_2$ and $I_2$ as shown in FIG. 3A.

In the prior diversity system, the vector sum $C_1$ and $C_2$ are combined at combiner 4 so that they are inphase with each other by adjusting phase shifter 3, and the resultant wave is $C_{1+2}$.

The above mentioned prior diversity system intends to provide the maximum combined power, therefore, the prior diversity system is merely effective for the improvement of the signal-to-noise ratio of a narrow band signal.

However, said prior inphase combining diversity system can not always improve the frequency characteristics in the wide band trasmission system. In particular, when there are interference waves which transmit through a different length of paths, the frequency characteristics are deteriorated. Thus, a high speed digital radio system which has the wide band width and the high speed data information of for instance 50 MB, cannot be composed by a prior diversity system. The situation will be described in detail mathematically.

Assuming that an intereference wave and a direct wave are received by each antenna as shown in FIG. 2, then, the received signal by a single antenna, and the combined signal by two antennas are shown below.

(a) In case of reception by a single antenna $$\dot{e}_i(\omega) = 1 + re^{-j\omega\tau_i} = R_i(\omega)e^{j\theta_i} \quad (1)$$

wherein $i=1$ or 2 (the suffix 1 relates to the first antenna 1, and the suffix 2 relates to the second antenna 2)

$$R_i(\Delta\omega) = \sqrt{1 + r^2 + 2\Gamma \cos \omega\tau_i} \quad (2)$$

$$= \sqrt{1 + r^2 + 2\Gamma \cos(\psi_i + \Delta\omega\tau_i)}$$

$$\theta_i = -\tan^{-1} \frac{\Gamma \sin \omega\tau_i}{1 + \Gamma \cos \omega\tau_i} \quad (3)$$

(b) In case of inphase combined reception by two antennas $$\dot{X}_s(\omega) = \dot{A}_{SD} \times \{1 + De^{-j\omega\tau_s}\} \quad (4)$$

where $$\dot{A}_{SD} = 2 \cos \frac{\psi}{2} \cdot e^{j\frac{\phi}{2}} \quad (5)$$

$\psi = \theta_1 - \theta_2$ (Condition of inphase combination) $\quad (6)$ $$D = \Gamma \cos \frac{\psi - \omega(\tau_2 - \tau_1)}{2} / \cos \frac{\psi}{2} \quad (7)$$

$$\tau_s = (\tau_1 + \tau_2)/2 \quad (8)$$

r; the amplitude ratio between the main wave and the interference wave.

$\tau_i$; the time difference between the main wave and the interference wave at the antenna (i).

$\omega; = \omega_0 + \Delta\omega$ $\omega_0$; the center frequency of the pass-band $\Delta\omega$; deviation from $\omega_0$.

$\psi_i$; the phase difference between the main wave and the interference wave caused by $\tau_i$, and is $\psi_i = -\omega_0\tau_i - 2N\pi$.

FIG. 3C shows the calculated curves of the above analysis, where the curve (a) shows the frequency characteristics of antenna 1 output signal, the curve (b) shows the one of antenna 2 and the curve (c) shows the inphase combined signal. The conditions for the calculation in FIG. 3C are shown below.

Center frequency = 5 GHz
$\tau_1$ = 4nS (nano seconds)
$r$ = 0.9
$\phi_1$ = 120°
$\phi_2$ = 170°
$e_1(\omega) = |\dot{e}_1(\omega)|$
$e_2(\omega) = |\dot{e}_2(\omega)|$
$X_s(\omega) = |\dot{X}_s(\omega)|$ From FIG. 3C, it is noted that the curve (c) is a little more improved compared with the curves (a) and (b), but said curve (c) is not sufficiently flat. If the wide band digital radio signals are transmitted under the characteristics as shown in the curve (c), the waveform of the signal would be deteriorated, and the bit error rate would be increased.

Thus, it should be concluded that a prior diversity system is not sufficient to provide the flat frequency characteristics although said prior diversity system can improve the received signal level.

SUMMARY OF THE INVENTION

It is an object, therefore, of the present invention to overcome the disadvantages and limitations of a prior diversity reception system and to supply a new diversity reception system which provides the flat frequency characteristics.

The above objects are attained by a diversity reception system composed by a pair of spaced antennas, a phase shifter connected to one of the antennas, a combiner connected to the outputs of said phase shifter and the other antenna, and control means controlling said phase shifter so that the phase of the interference wave received by the first antenna is opposite phase to that received by the second antenna at the inputs of said combiner, and that the interference waves of the two antennas are cancelled by each other.

BRIEF DESCRIPTION OF THE DRAWINGS

The foregoing and other objects, features, and attendant advantages of the present invention will be also appreciated by means of the following description and accompanying drawings wherein;

FIG. 5 shows the direction of the control of the phase shifter for performing the operation shown in FIGS. 4A and 4B, FIG. 7 is the circuit diagram of the control circuit 26 in FIG. 6, FIG. 17A is the block diagram of the timing signal generator 72 in FIG. 16, FIG. 17C is the block diagram of the sampling circuit (70a, 70b, 70c) in the apparatus shown in FIG. 16, FIG. 18, including a-e, shows the waveforms for the explanation of the operation of the fourth embodiment of the apparatus shown in FIG. 16.

DESCRIPTION OF THE PREFERRED EMBODIMENTS

Figure 1:
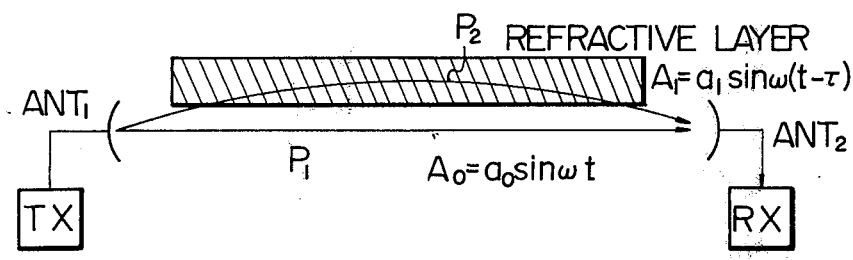
FIG. 1 shows the multipath propagation in a radio system.
Figure 2:
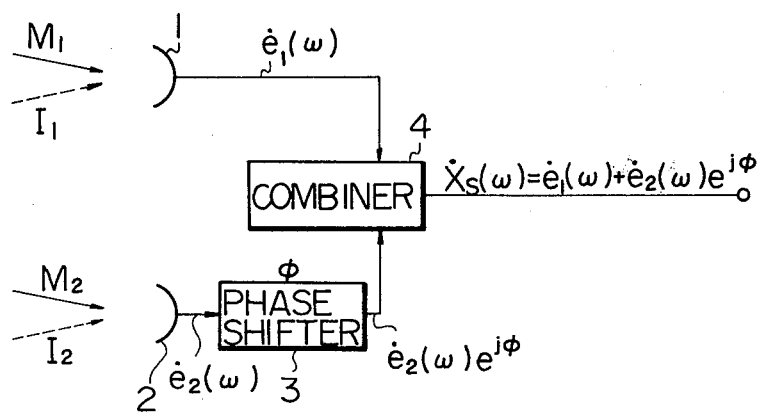
FIG. 2 shows the principle structure of a prior diversity reception system.
Figure 3A:
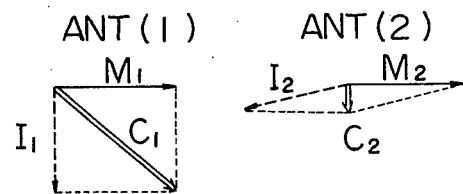
FIG. 3A, and FIG. 3B show the operation of the prior inphase combination.
Figure 3B:
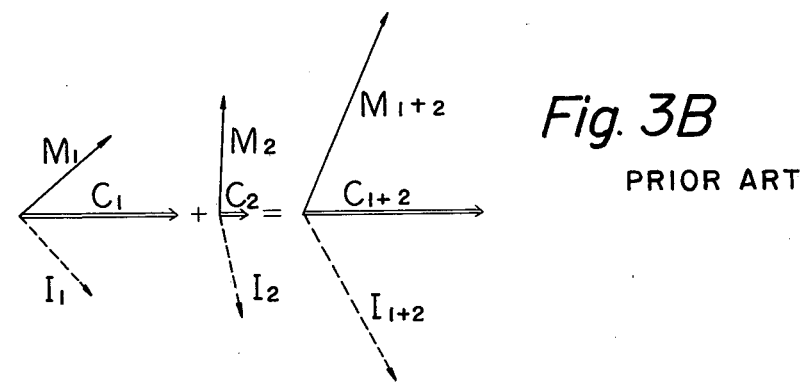
Figure 3C:
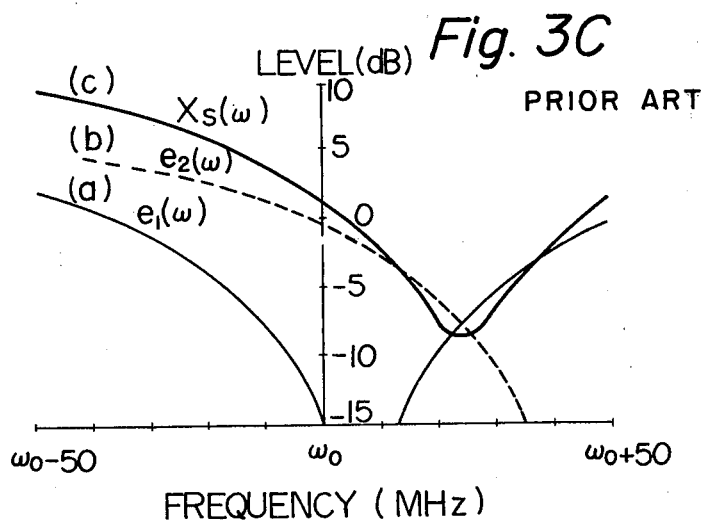
FIG. 3C shows the frequency characteristics according to a prior inphase diversity system.
Figure 4A:
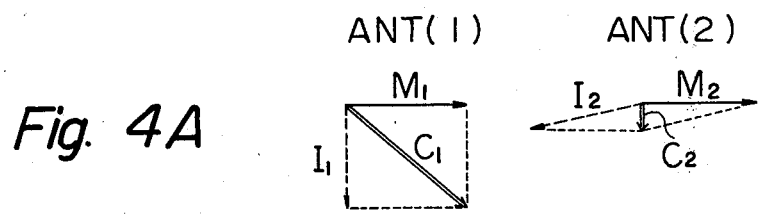
FIG. 4A and FIG. 4B show the operation of the diversity system according to the present invention.
Figure 4B:
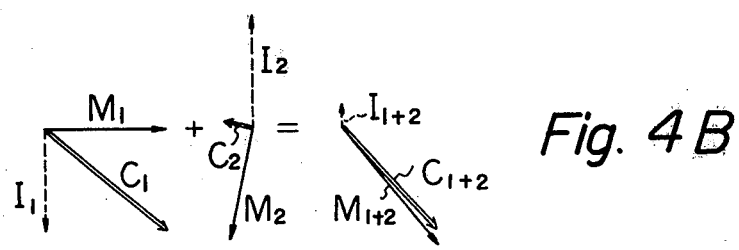
Figure 4C:
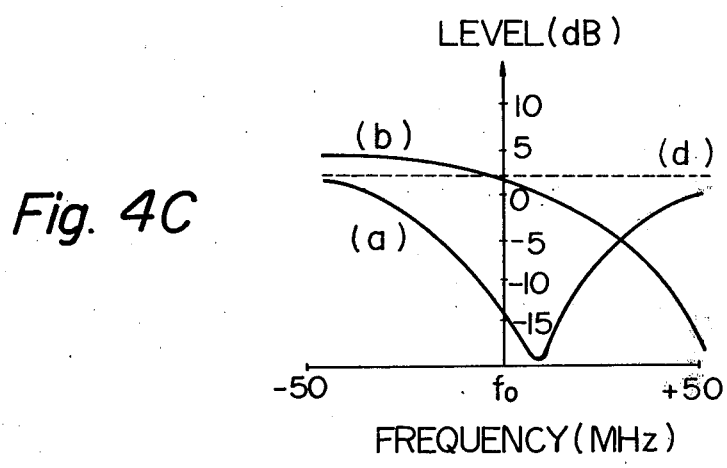
FIG. 4C shows the frequency characteristics according to the present diversity reception system.

FIGS. 4A through 4C show the theoretical principle of the present diversity reception system. FIG. 4A shows two component waves received by the antennas 1 and 2, and is the same as FIG. 3A. According to the present invention, two signals received by two antennas are combined so that the interference waves $I_1$ and $I_2$ are in opposite phase with each other as shown in FIG. 4B. Therefore, the interference components which have the different phase due to the different delay time are cancelled with each other, and thus, the frequency characteristics of the combined signal can be flat as shown in FIG. 4C, in which the curves (a) and (b) are the same as those in FIG. 3C, and the curve (d) shows the frequency characteristics of the combined signal according to the present invention.

The first embodiment of this invention will be described in accordance with FIGS. 5 and 6.

The level difference $\Delta x$ of the combined signal between the level at the frequency $(\omega_o - \Delta\omega)$, and the frequency $(\omega_o + \Delta\omega)$ is shown below utilizing the above mentioned formula (4).

$$\Delta \chi = |\dot{X}_s(\omega_o + \Delta\omega)| - |\dot{X}_s(\omega_o - \Delta\omega)| \qquad (9)$$
$$= K_1 \sin b \sin\left(\frac{\Delta\psi}{2} + a\right) \sin \frac{\Delta\psi}{2}$$

where $K_1$ is a constant, $$a = (\psi_2 - \psi_1)/2 \qquad (10)$$

$$b = (\psi_2 + \psi_1)/2 \qquad (11)$$

$$\Delta\psi = \phi - (\psi_2 - \psi_1 - \pi) \qquad (12)$$

(control error of the phase shifter)
Also, $\Delta R^2$ is defined as follows.

$$\Delta(R)^2 = R_2{}^2(\omega_o) - R_1{}^2(\omega_o) = -4K_2 \sin b \sin a \qquad (13)$$

From the formulae (9) and (13), the value $\Delta\psi$ is expressed below, on the condition that $\Delta x$ is close to zero.

$$\sin \frac{\Delta\psi}{2} = -4K_1K_2 \Delta X \Delta R^2 \qquad (14)$$

Accordingly, the sign of the $\Delta\psi$ ($\text{sgn}(\Delta\psi)$) is expressed by the following formula.

$$sgn(\Delta\psi) = sgn\Delta_X \cdot \Delta R^2 = sgn(\Delta x) x (\Delta R) \quad (15)$$

where $\Delta R = R_2(\omega_o) - R_1(\omega_o)$, and the sign of $\Delta R^2$ is the same as the sign of $\Delta R$. Accordingly, the sign of $\Delta\psi$ is shown in FIG. 5.

Figure 6:
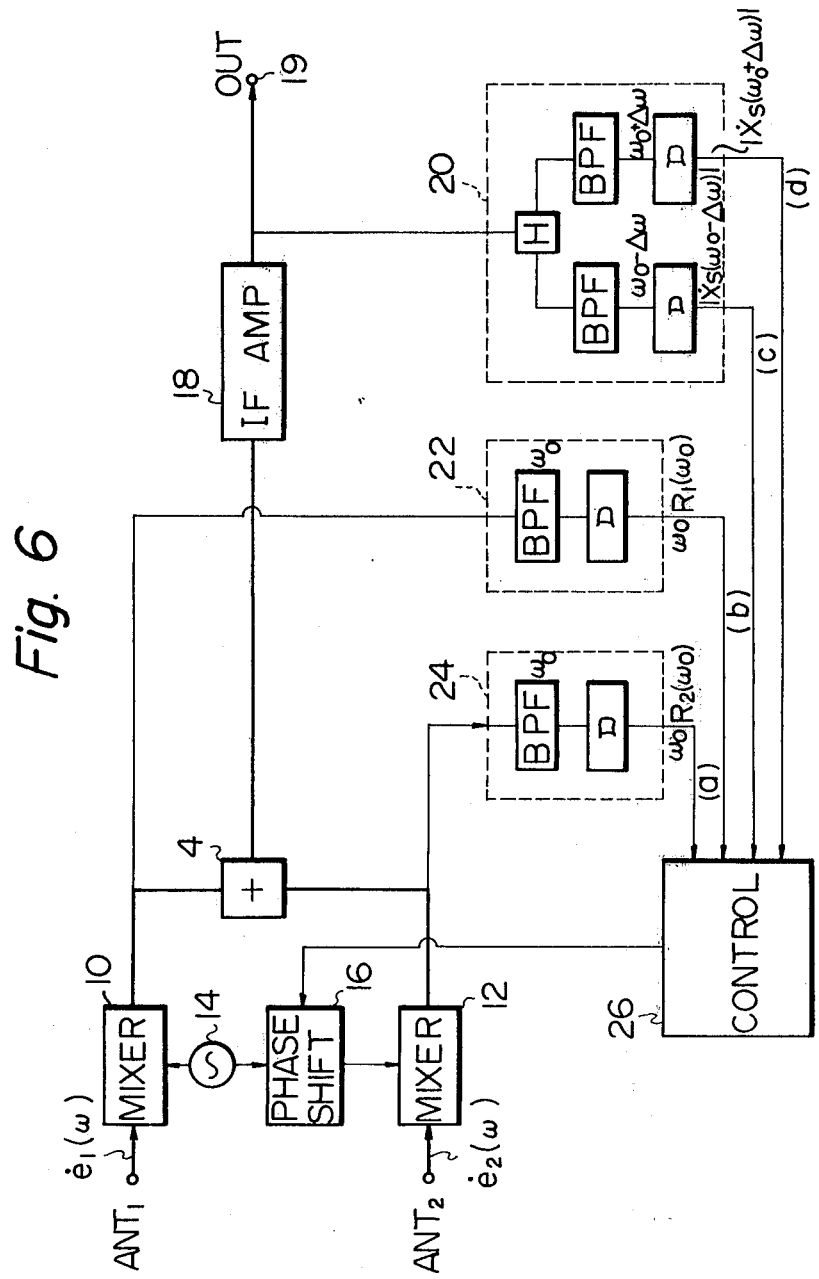
FIG. 6 is the block diagram of the first embodiment of the present diversity system for performing the operation shown in FIGS. 4A and 4B.

FIG. 6 shows the block diagram of the diversity reception system according to the implementation of FIG. 5.

In FIG. 6, the reference numerals 10 and 12 are frequency mixers for converting the radio frequency to the intermediate frequency (IF), 14 is a local oscillator for said frequency conversion, 16 is a phase shifter for providing the phase controlled local frequency to one of the mixers, 18 is an intermediate frequency amplifier, 19 is an output terminal of the IF signal, 20, 22 and 24 are level detectors, and 26 is a control circuit of said phase shifter 16.

The first wave received by the first antenna $ANT_1$ is applied to the first mixer 10 which converts the radio frequency to the intermediate frequency utilizing the local frequency from the local oscillator 14, similarly, the second wave received by the second antenna $ANT_2$ is applied to the second mixer 12 which converts the radio frequency to the intermediate frequency utilizing the local frequency from the local oscillator 14 through the phase shifter 16. The outputs of the mixers 10 and 12 are combined by the combiner 4, the output of which is applied to the output terminal 19 through the intermediate frequency amplifier 18. It should be noted that the phase of the output of the second mixer 12 is controlled by the phase shifter 16 so that the phase of the interference wave of the second wave is the opposite of that of the first interference wave. The level of the outputs of the mixers 10 and 12 are detected by the level detectors 22 and 24, which provide the value corresponding to the level of center frequency ($\omega_o$) of the converted intermediate frequency. The level detectors 22 and 24 provide the value $R_1(\omega_o)$ and $R_2(\omega_o)$ respectively to the control circuit 26 through output lines (a) and (b). For the information source for the level detection, the modulated signal itself is used when the transmission signal is a digital signal which has the constant spectrum, and a pilot signal inserted in the transmission signal are used when the spectrum of the transmission signal is not constant such as SSB-Am modulated signal.

Similarly, the level detector 20 provides the level of the combined signal at the frequencies ($\omega_o - \Delta\omega$) and ($\omega_o + \Delta\omega$) to the output lines (c) and (d) respectively. It should be appreciated that the level (a) corresponds to $R_1(\omega_o)$, the level (b) corresponds to $R_2(\omega_o)$, the level (c) corresponds to $|X_s(\omega_o + \Delta\omega)|$, the level (d) corresponds to $|X_s(\omega_o - \Delta\omega)|$, and then the value (d-c) corresponds to $\Delta x$ in the above formula (9).

The control circuit 26 controls the amount of the phase shift in the phase shifter 16 utilizing said detected levels (a) through (d) according to the decision table shown in FIG. 5, where the symbol (+) shows that the phase shift must be increased, and (−) shows the amount of the phase shift must of decreased, and when the level (d) becomes equal to the level (c) the phase shift control finishes.

In FIG. 6, the mixers 10 and 12, the local oscillator 14, the intermediate amplifier 18 are conventional and obvious to those skilled in the art. The combiner 4 and the phase shifter 16 are also obvious and are shown for instance in British Pat. No. 810,698. The level detectors 20, 22 and 24 are implemented by utilizing a hybrid circuit (H), a bandpass filter (BPF) and a diode detector (D). The control circuit 26 is implemented by utilizing a subtractor ($SUB_1$, $SUB_2$) and an AND circuit ($A_1 \sim A_4$) as shown in FIG. 7. Alternatively, said control circuit can be composed by a programmed microcomputer.

By the way, the above mentioned embodiment has the assumption that each input wave has both the direct wave and the indirect interference wave. However, when there is no interference wave, the frequency characteristics of the combined signal is apparently flat. In that case, the combined level might be considerably decreased depending upon the situation of the phase shifter 16, since the above embodiment controls the phase shifter so that $\Delta x = 0$ for all the situation.

For solving the above problem, when an input signal has only a direct wave, the control is switched to a prior inphase combination. The situation that the input signal is only a direct wave is detected by the situation shown below.

$$\left. \begin{array}{l} R_1(-\Delta\omega) = R_1(+\Delta\omega), R_2(-\Delta\omega) = R_2(+\Delta\omega), \\ X_s(-\Delta\omega) = X_s(+\Delta\omega) \end{array} \right\} \quad (16)$$

Some modifications or alternatives are possible from the embodiment in FIG. 6.
(a) The combiner can be installed at the radio frequency stage although the combiner in FIG. 6 is installed at the intermediate frequency stage. When the combiner is installed at the radio frequency stage, a phase shifter can be installed in one of the signal paths.
(b) A single level detector is available instead of three level detectors shown in FIG. 6. When a single level detector is used, said level detector is switched to the four inputs for providing the levels (a) through (d).

Now, the second embodiment of the present invention will be described in accordance with FIGS. 8 through 11, and the second embodiment controls the phase shift so that the distortion of the combined signal becomes minimum and then, cancels the interference waves with each other.

Figure 8:
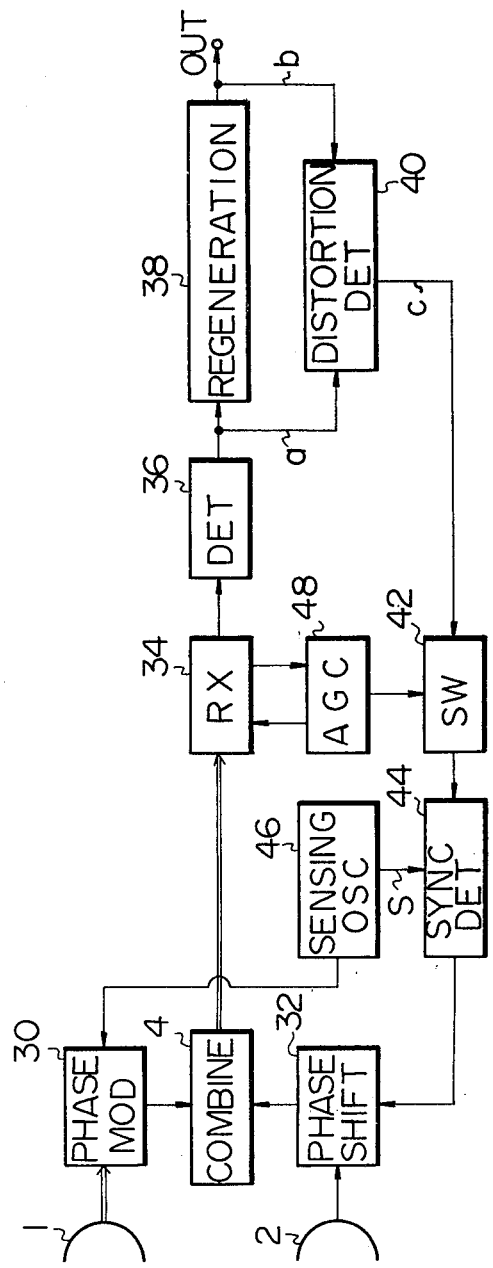
FIG. 8 is the block diagram of the second embodiment of the present diversity system.

In FIG. 8, the reference numeral 1 is the first antenna, 2 is the second antenna, 4 is a combiner, 30 is a phase modulator, 32 is a phase shifter, 34 is a receiver, 36 is a detector, 38 is a regenerator, 40 is a distortion detector, 42 is a switching circuit, 44 is a synchronization detector, 46 is a sensing oscillator, and 48 is an automatic gain control circuit.

The signals received by the antennas 1 and 2 are applied to the phase modulator 30 and the phase shifter 32, respectively, and the outputs of the latters are combined by the combiner 4. The combined output signal from the combiner 4 is applied to the receiver 34, which removes the amplitude change by utilizing the automatic gain control 48. The output of the receiver 34 is detected by the detector 36, and the regenerator 38 recognizes the symbols at the output of the detector 36. The regenerated digital symbols are derived from the output terminal (OUT). On the other hand, the distortion detector 40 provides the signal (c) which corresponds to the distortion generated in the transmission path, utilizing the input signal (a) and the output signal (b) of the regenerator 38.

Figure 9A:
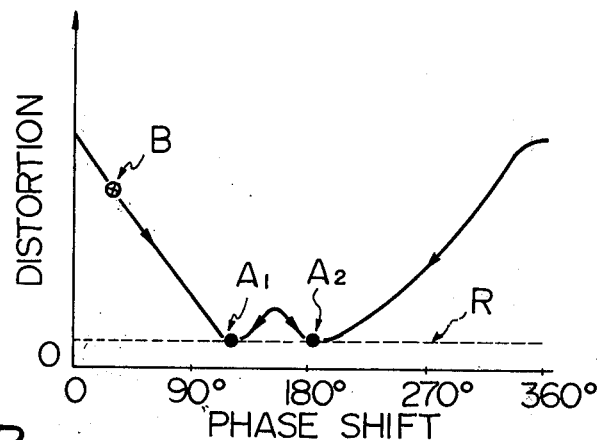
FIG. 9A shows the curve between the phase shift in the phase shifter and the distortion for the explanation of the operation of the apparatus in FIG. 8.
Figure 9B:
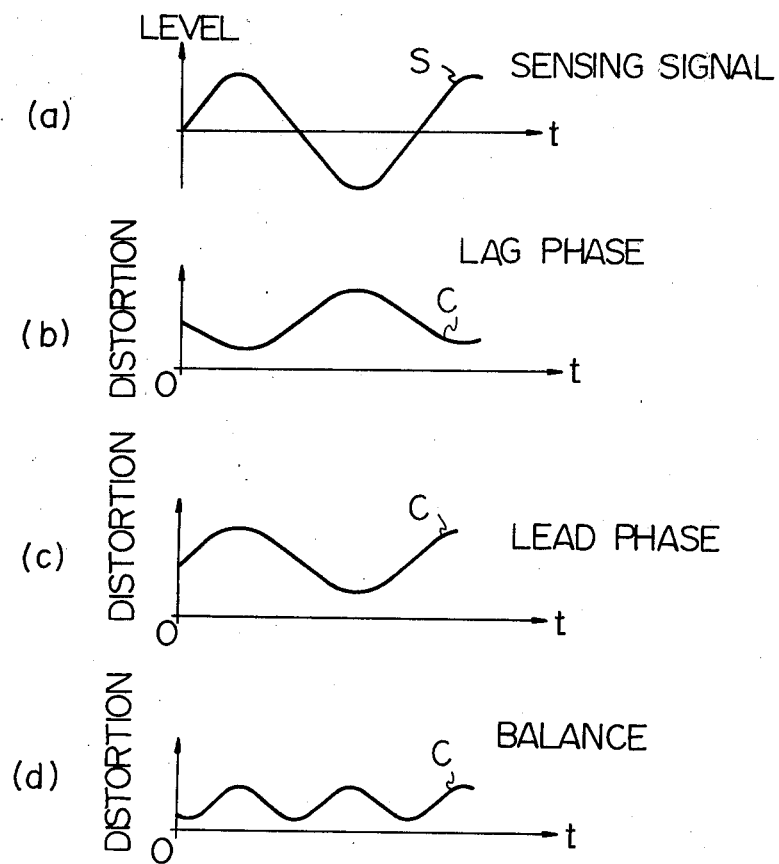
FIG. 9B shows the curves and the operation of the apparatus shown in FIG. 8, FIGS. 10A, 10B, 10C and 10D show the block diagrams of the distortion detector 40 in FIG. 8.

FIG. 9A shows the relationship between the amount of the phase shift by the phase shifter 32 (horizontal axis), and the distortion (c) detected by the distortion detector 40 (vertical axis). As apparent from FIG. 9A, there are two points ($A_1$ and $A_2$) which give the minimum distortion. Since the signal received by the antenna 1 is modulated by the phase modulator 30 with the output signal (S) from the sensing oscillator 46 as shown in FIG. 9B(a), the phase of the combined signal at the output of the receiver 34 changes periodically. Accordingly, the output (c) of the distortion detector 40 is also changed periodically as shown in FIG. 9B. FIG. 9B(b) is the case that the phase is lag and the distortion waveform (c) is in the opposite phase with the sensing waveform, and this means that the phase shift by the phase shifter 32 is too small. On the other hand, FIG. 9B(c) is in the same phase as the sensing waveform of FIG. 9B(a), and this means that the phase shift by the phase shifter 32 is too large. Accordingly, the synchronization detector 44 detects whether the phase of the output of the distortion detector 40 is the same as the phase of the sensing oscillator 46 and according to the polarity of synchronization detector output, the phase shifter 32 is controlled so that the distortion (c) of the output of the distortion detector 40 becomes minimum. The control direction of the phase shifter 32 is shown by the arrows in FIG. 9A. At the points $A_1$, $A_2$ where the distortion becomes minimum and the control is balanced as shown in FIG. 9B(d).

In FIG. 9A, the balance point $A_1$ is the case that the interference waves are cancelled with each other, and the balance point $A_2$ is the case that direct waves are cancelled by each other. Since the amplitude of an interference wave is smaller than that of a direct wave, it is preferable to balance at the first balance point $A_1$. By the way, the point B in FIG. 9A shows the balance point when a prior inphase combination is carried out. In general, the phase shift at the point B is closer to the first balance point $A_1$ than to the second balance point $A_2$. Accordingly, the switch 42 shown in FIG. 8 connects initially the output of the automatic gain control 48 to the input of the synchronization detector 44 so that the inphase combination is performed, and after the combined level becomes maximum and the operation situation reaches the point B in FIG. 9A, the switch 42 connects the output of the distortion detector 40 to the input of the circuit 44. Then, the operation point is balanced at the first balance point $A_1$ where the interference components are cancelled with each other.

It should be appreciated that the control thus described cancels always the interference components and that the frequency characteristics in the pass-band becomes flat so as to provide a preferable digital signal transmission.

The components in the block diagram in FIG. 8 are well known except the distortion detector 40. In particular, the phase modulator 30, the phase shifter 32, the combiner 4, the sensing oscillator 46 and the synchronization detector 44 are shown in said British Pat. No. 810,698. The receiver amplifier 34, the automatic gain control 48 are shown in U.S. Pat. No. 4,079,318. The regenerator 40 can be implemented by the integrated circuit MC-1670 manufactured by Motorola Co. in U.S.A. The detector 36 and the switch 42 are apparently obvious to those skilled in the art.

Now, some embodiments of the distortion detector 40 will be described.

Figure 10A:
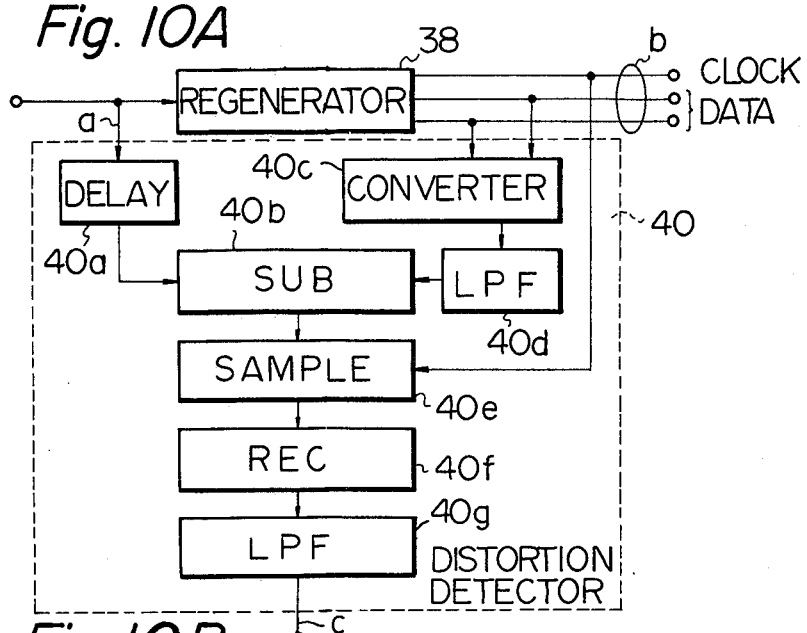

FIG. 10A shows the block diagram of the first embodiment of the distortion detector. In the figure, reference numeral 40a is a delay circuit, 40b is a subtractor, 40c is a binary-multilevel converter, 40d is a low pass filter which has the characteristics equivalent with that of the radio transmission path, 40e is a sampling circuit which receives the clock output of the regenerator 38 and the output of the subtractor 40b. 40f is a full-wave rectifier, and 40g is a low pass filter. When the transmitted digital signal is a multilevel digital signal, the data output of the regenerator 38 is applied to the binary-multilevel converter 40c and the low pass filter 40d so that the signal with no distortion relating the transmitted signal is obtained at the output of the low pass filter 40d. On the other hand, the input signal (a) which has the multipath distortion is applied to the subtractor 40b through the delay circuit 40a, which provides the delay time corresponding to the delay time in the regenerator 38, the converter 40c and the low pass filter 40d. The subtractor 40b provides the difference between the signal with no distortion and the signal with the distortion, that is to say, said difference is only the distortion component in the signal. The output of the subtractor 40b is applied to the sampling circuit 40e which derives the distortion signal at the sampling time. The fullwave rectifier 40f provides the absolute value of the distortion, and the low pass filter 40g removes the harmonic components, and thus the output (c) relating to the distortion is obtained at the output of the low pass filter 40g.

When the transmitted digital signal is a binary signal (for instance 4 phases PSK signal), said binary-multilevel converter 40c is not necessary. Also, when the frequency characteristics of the low pass filter 40d is completely the same as that of the transmission path (including transmission filter and reception filter), the sampling circuit 40e can be removed. When the sampling circuit 40e is an ideal one, the low pass filter 40d can be removed. Further, when a digital signal is repeated by a repeater station, the binary-multilevel conversion and the low pass filtering are performed utilizing a modulator, and so the binary-multilevel converter 40c and the low pass filter 40d are removed.

Figure 10B:
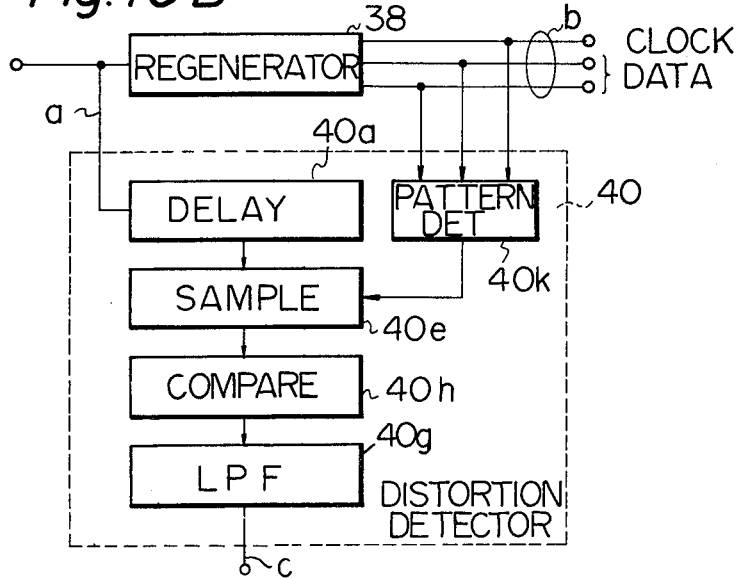

FIG. 10B shows the block diagram of the second embodiment of the distortion detector according to the present invention. In FIG. 10B, 40h is a comparator, and 40k is a pattern detector. The pattern detector 40k derives the predetermined pattern (symbol series) from the transmitted signal, and the sampling circuit derives the signal which has the distortion relating to that predetermined pattern. The comparator compares the received predetermined pattern which has the distortion, with the reference pattern which has no distortion and is stored in the reception side beforehand, then, the distortion component (c) is obtained from the output of the low pass filter 40g which is connected to said comparator 40h.

FIG. 10C shows the block diagram of the third embodiment of the distortion detector according to the present invention. In FIG. 10C, the reference numeral 38a is the second regenerator, 40m is an adder, 40n is a noise generator, 40p is an Exclusive-OR circuit, 40q is a counter, 40r is a digital-to-analog converter. In FIG. 10C, the input signal of the second regenerator 38a is the sum of the transmission signal and the output of the noise generator 40n, that is to say, the signal-to-noise ratio of the input signal of the second regenerator 38a is worse than that of the first regenerator 38, and so the error rate of the second regenerator 38a is larger than that of the first regenerator 38. So the waveform distortion is measured in the form of the error rate. The Exclusive-OR circuit 40p provides the error pulse when the output of the first regenerator 38 is different from the output of the second regenerator 38a, and the number of the pulses of the circuit 40p is counted by the counter 40q, the content of which is output in the analog form through the digital-to-analog converter 40r, as the distortion.

FIG. 10D shows the block diagram of the fourth embodiment of the distortion detector according to the present invention, and in the figure, the reference numeral 38a is the second regenerator, 40p is the Exclusive-OR circuit, 40s is the counter and 40t is the digital-to-analog converter. In the embodiment of FIG. 10D, the threshold level of the second regenerator 38a is different from the threshold level of the first regenerator 38. Accordingly, when the signal is distorted, the second regenerator 38a generates the recognition errors. The Exclusive-OR circuit 40p detects said error generated in the second regenerator 38a. The number of the errors which is the representative of the distortion is counted by the counter 40s, and converted to analog signal by digital-to-analog converter 40t. Thus, the embodiment of FIG. 10D utilizes the principle that the distortion has the strong correlation with the number of errors in a predetermined duration.

Some modifications and alternatives for the embodiment of FIG. 8 are possible to those skilled in the art as follows.

(a) The phase modulator 30 can be connected to the second path which has the phase shifter 32. Further, when the high speed operation of the phase shifter 32 is possible, the phase shifter can double as a phase modulator. So the phase modulator 30 can be omitted.

(b) Although FIG. 8 shows the combining in the radio frequency stage, the combination in the intermediate frequency stage like FIG. 6 is of course possible.

(c) Although the switch 42 in the above embodiment is connected to the automatic gain control 48 only at the initial stage, the alternate control of the switch 42 is possible so that the switch 42 is connected to the automatic gain control 48 when the level of the output of the combiner 4 is lower than the predetermined level. In this control the reception level is higher than the preferred level is always obtained.

Figure 11:
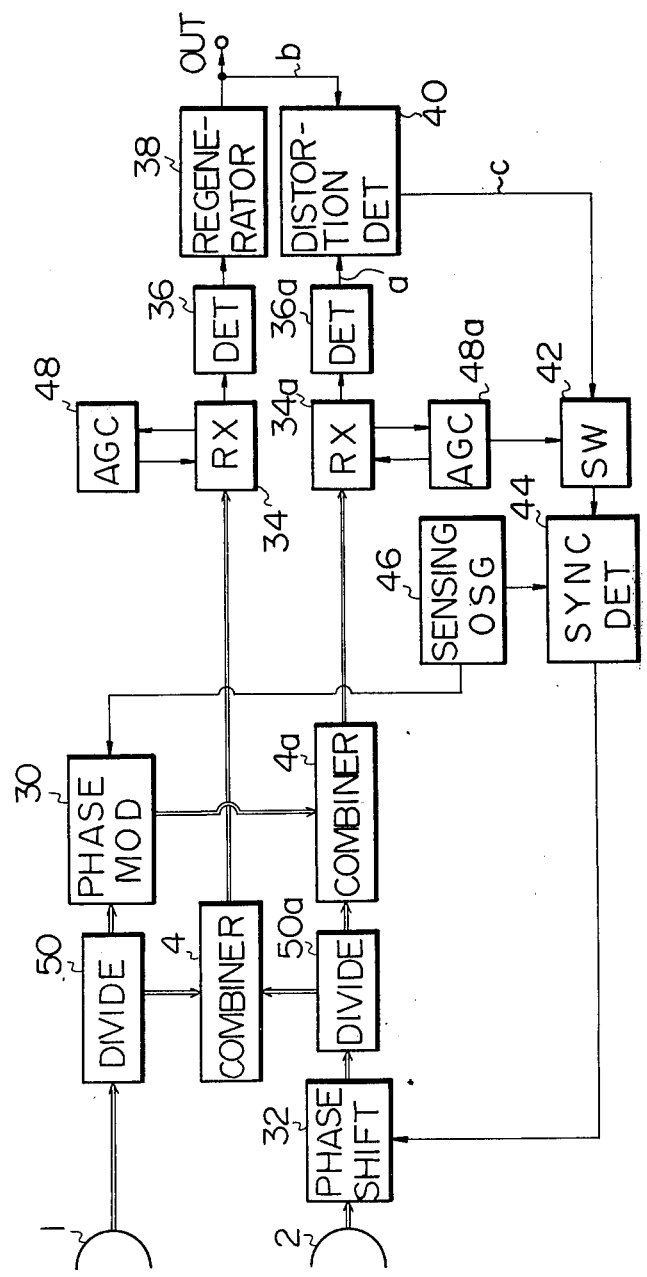
FIG. 11 shows the block diagram of the modification of the embodiment shown in FIG. 8.

(d) The phase modulator 30 in FIG. 8 can improve the signal-to-noise ratio of the control signal when the maximum phase shift is large. However, when the phase shift in the phase modulator is too large, the undesired phase change and/or the undesired amplitude change in the combined signal is occurred, and the transmission quality is deteriorated. For solving that problem, the modification shown in FIG. 11, which has the separate control means is possible. In FIG. 11, the input signals are divided into two paths by the dividers 50 and 50a. The first main path comprising the first combiner 4, the receiver amplifier 34, the automatic gain control 48, the detector 36, and the regenerator 38 is utilized for the demodulation of the received digital signal. And the second path comprising the second combiner 4a, the second receiver amplifier 34a, the second detector 36a, the automatic gain control 48a, the distortion detector 40, the switch 42, the synchronization detector 44 and the sensing oscillator 46 is utilized only for the control of the phase shifter 32. In the modification of FIG. 11, the phase modulator 30 is connected outside of the main demodulation path, and so the deep phase modulation by the phase modulator 30 is possible without deteriorating the signal quality in the main path.

Although the above second embodiment is described in accordance with two waves model which has a main wave and a single interference wave, the present embodiment can be applicable to the case that there are more than two interference waves by controlling the system so that the distortion becomes minimum.

Now, the third embodiment according to the present diversity reception system will be described in accordance with FIGS. 12 through 14C.

Figure 12:
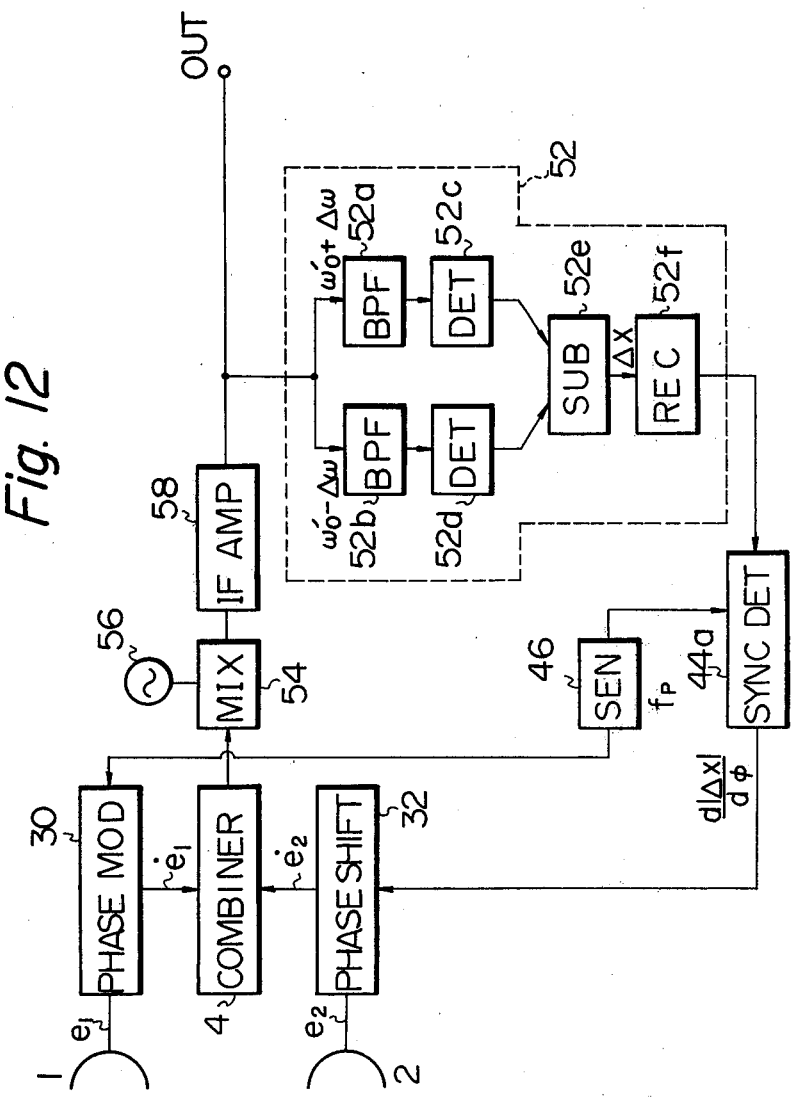
FIG. 12 shows the block diagram of the third embodiment of the diversity system according to the present invention.

In FIG. 12, the signal in the first branch relating to the first antenna 1 is applied to the combiner 4 through the phase modulator 30, which modulates the input signal with the control signal from the sensing oscillator 46. The signal in the second branch relating to the second antenna is also applied to the combiner 4 through the phase shifter 32, which controls the phase of the input signal so as to cancel the interference waves. The combined output signal of the combiner 4 is frequency converted by the frequency mixer 54 which is supplied the local frequency by the local oscillator 56. The output of the frequency mixer 54 is applied to the output terminal (OUT) through the intermediate frequency amplifier 58. The output of the amplifier 58 is also applied to the frequency response detector 52, which provides the amplitude dispersion and/or the delay dispersion in the pass-band of the transmission signal. The synchronization detector 44a controls the amount of the phase shift in the phase shifter 32 in accordance with the outputs of the sensing oscillator 46 and the frequency response detector 52. Of course the control of the phase shifter 32 is performed so that the deviation in the pass-band detected by the frequency detector 52 is reduced, when the deviation is minimum, the interference waves are in an opposite phase with each other, and the frequency characteristics are flat as shown in the curve (d) in FIG. 4C. The sensing oscillator 46 and the phase modulator 30 are provided for the easy detection of the minimum deviation.

The deviation detector 52 has the narrow bandpass filters 52a and 52b, the center frequency of which is $(\omega_o' + \Delta\omega)$ and $(\omega_o' - \Delta\omega)$, respectively, where $\omega_o'$ is the center frequency of the frequency converted IF signal. 52c and 52d are diode detectors, 52e is a subtractor, and 52f is a fullwave rectifier. The frequency responce detector 52 in the embodiment detects the amplitude dispersion in the pass-band of the combined signal. The bandpass filter 52a and the detector 52c detect the level at the frequency $(\omega_o' + \Delta\omega)$, and the bandpass filter 52b and the detector 52d detect the level at the frequency $(\omega_o' - \Delta\omega)$. Therefore, the subtractor 52e provides the difference of the levels between $(\omega_o' + \Delta\omega)$ and $(\omega_o' - \Delta\omega)$. That is to say, the subtractor 52e provided the dispersion of the amplitude in the pass-band. The output of the subtractor 52e is applied to the synchronization detector 44a through the rectifier 52f. The level detection is performed utilizing a pilot signal inserted in the transmission signal, or alternatively, said level detection is performed by utilizing the transmission signal itself if the average level of the transmission signal is constant in the frequency range $(\omega_o' \pm \Delta\omega)$.

Figure 13A:
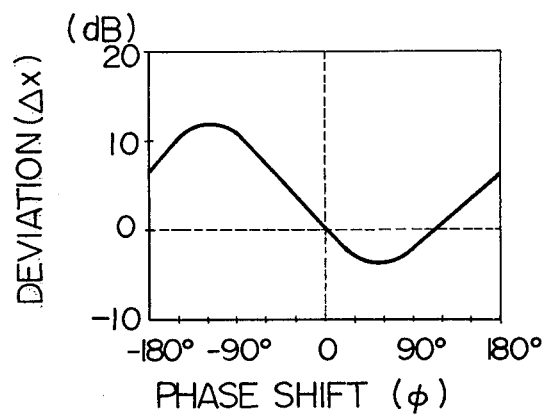
FIGS. 13A, 13B and 13C show the operation of the apparatus shown in FIG. 12, FIGS. 14A, 14B and 14C show another operation of the apparatus shown in FIG. 12.
Figure 13B:
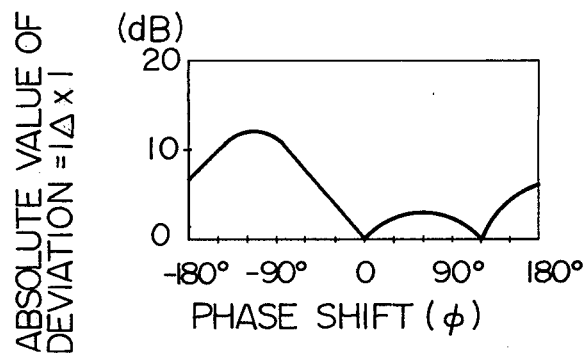
Figure 13C:
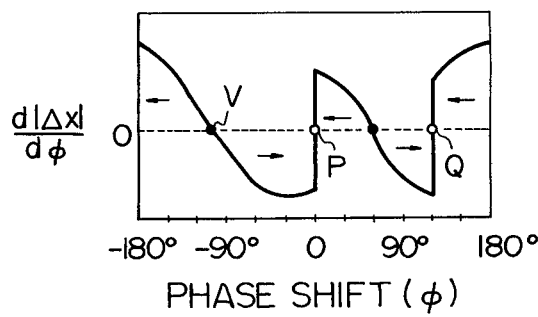

The synchronization detector 44a substantially detects the differential coefficient of the dispersion in the pass-band by detecting the same frequency as the output of the sensing oscillator 46, from the output of the dispersion detector 52. FIGS. 13A through 13C show the operation of the synchronization detector 44a.

FIG. 13A shows the deviation $\Delta x$ which is provided at the output of the subtractor 52e, and FIG. 13B shows the absolute value of the dispersion Δx which is provided at the output of the fullwave rectifier 52f. In those figures, the horizontal axes show the amount of the phase shift by the phase modulator 30. FIG. 13C shows the differential coefficient $d|\Delta x|/d\phi$ of the curve of FIG. 13B, and said differential coefficient is detected by the synchronization detector 44a for each phase shift provided from the sensing oscillator 46. The direction of the control of the phase shifter 32 is defined by the sign of said differential coefficient and said direction is shown by the arrow in FIG. 13C. Accordingly, the amount of the phase shift by the phase shifter 32 will balance either at the point P or Q in FIG. 13C. The point P shows the phase shift where the interference waves are in the opposite phase with each other, and the point Q shows the phase shift where the direct waves are in the opposite phase with each other. Both the point P and Q can provide the flat frequency characteristics.

Figure 14A:
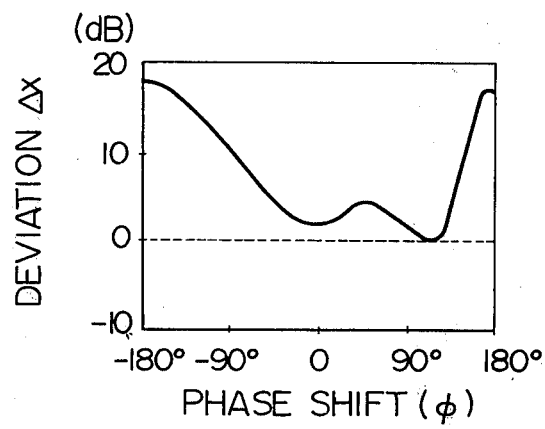
Figure 14B:
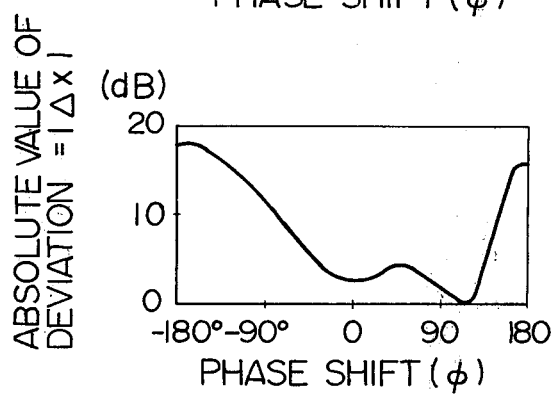
Figure 14C:
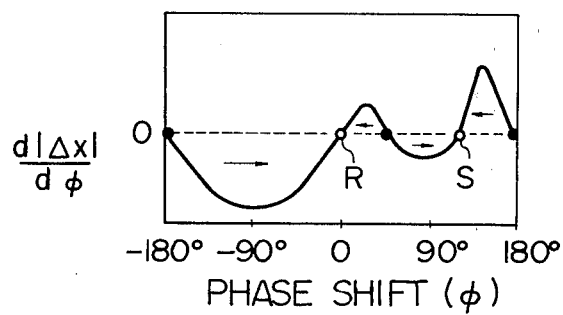

FIGS. 14A through 14C show the other operation of the synchronization detector 44a when the amplitude of the first interference wave is different from the amplitude of the second interference wave. And, FIG. 14A is the output of the subtractor 52e, FIG. 14B is the output of the fullwave rectifier 52f, and FIG. 14C is the differential coefficient of the curve in FIG. 14B. In those figures, the horizontal axes are the phase shift by the phase modulator 30 and are provided by the sensing oscillator 46. It should be appreciated that the control is balanced at either point R or S in FIG. 14C. However, at the balancing points, the deviation Δx in the passband is not always zero as shown in FIG. 14A.

Accordingly, the control to minimize the deviation is possible even when the amplitude of the interference waves is different from each other.

However, when the ratio of the amplitude of the first interference wave to that of the second interference wave is too large, the residual dispersion at the balancing point is not always small. In order to solve this problem, the switching circuit like the switch 42 in FIG. 8 can be introduced. That is to say, when the amplitude of the received signal is lower than the predetermined level, the combination system is switched to the conventional inphase combination system, and when the received amplitude exceeds said predetermined level, the control is switched to the system shown in FIG. 12.

Now, the fourth embodiment of the present invention will be described in accordance with FIGS. 15 through 20. The fourth embodiment controls phase shifter so that the interference waves are in the opposite phase with each other utilizing only the combined signal.

The level dispersion of the output of the combiner is as follows.

The level dispersion Δx between the most extreme ends $(\omega_o \pm \Delta\omega)$ of the pass-band is shown from the formula (9), $$\Delta x = x(\Delta\omega) - x(-\Delta\omega) \quad (17)$$
$$= K_1 \sin\left(\frac{\Delta\psi}{2} + a\right) \sin b \sin \frac{\Delta\psi}{2}$$

Figure 15:
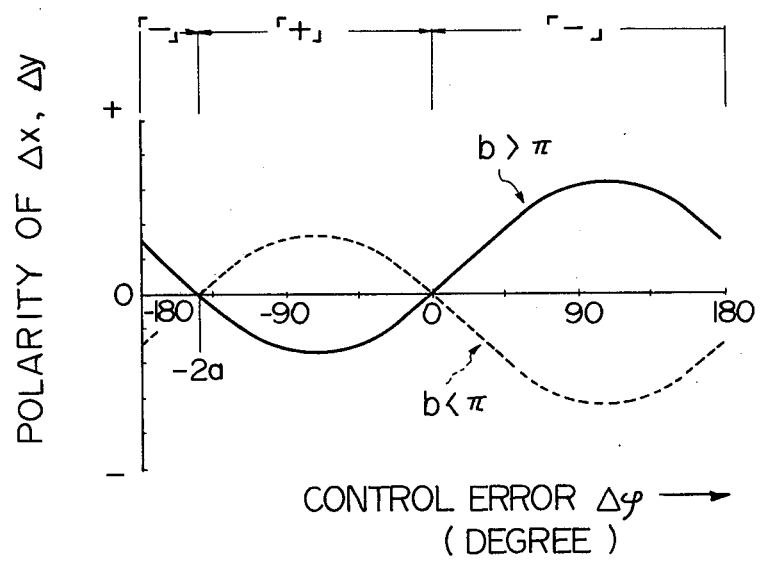
FIG. 15 shows the principle of the fourth embodiment of the diversity system according to the present invention.

Also, the level dispersion Δy between the extreme end $(\omega_o + \Delta\omega)$ and the center $\omega_o$ of the pass-band is shown below.

$$\Delta y = x(\Delta\omega) - x(0) \quad (18)$$
$$= K_3 \sin\left(\frac{\Delta\psi}{2} + a\right) \sin\left(b - \frac{\Delta\omega\tau_5}{2}\right) \sin \frac{\Delta\psi}{2}$$

Where $K_3$ is a positive constant. The signs (positive or negative) of Δx and Δy for the phase control error Δψ change as shown in FIG. 15, where the symbols (+) and (−) show the direction of the control of a phase shifter. From the figure, if the sign of $(b - \pi)$ is known, the control for providing $\Delta\psi = 0$ (the condition that the interference waves cancel with each other) is possible by deriving the condition that both the dispersions Δx and Δy become zero. In FIG. 15, although the characteristics become flat when $\Delta\psi = -2a$, that is the case that the main waves are cancelled with each other. Since the sign of the differencial coefficient at the point $\Delta\psi = -2a$ is opposite to that at the point $\Delta\psi = 0$, the control for balancing to the point $\Delta\psi = 0$ is possible.

Figure 16:
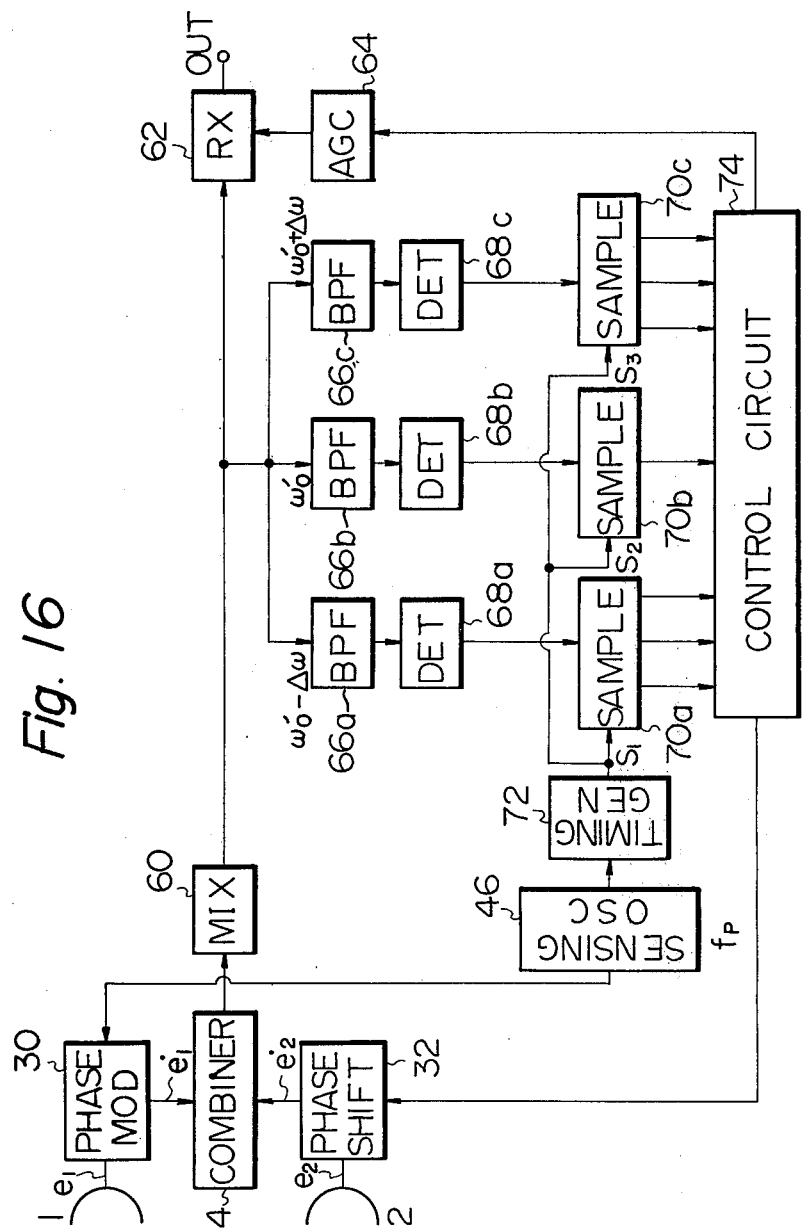
FIG. 16 is the block diagram of the fourth embodiment of the diversity system according to the present invention.

FIG. 16 shows the block diagram of the diversity reception system of the fourth embodiment of the present invention utilizing the principle in FIG. 15.

In FIG. 16, the signal $e_1$ received by the first antenna 1 is applied to the phase modulator 30, which modulates the signal with the frequency $f_p$ from the sensing oscillator 46. The phase modulated signal $e_1'$ is applied to the combiner 4. The second signal $e_2$ received by the second antenna 2 is phase-shifted by the phase shifter 32, and the phase shifted signal $e_2' = e_2 \cdot \exp(j\phi)$ is also applied to the combiner 4, which combines or sums up the signals from the antennas 1 and 2. The combined signal has its frequency converted by the frequency converter 60, the output of which is applied to the receiver amplifier 62, and the output of the amplifier 62 is obtained at the output terminal (OUT).

The intermediate frequency signal at the output of said frequency converter 60 is applied to the three bandpass filters 66a, 66b and 66c, the center frequencies of which are $\omega_o' - \Delta\omega$, $\omega_o'$, and $\omega_o' + \Delta\omega$, respectively. The outputs of those bandpass filters are applied to the level detectors 68a, 68b, and 68c, respectively, and the level at the three point frequencies is measured.

When there is a phase difference between the signal $e_1'$ and $e_2'$ at the inputs of the combiner 4, the output of the detector (68a, 68b, or 68c) has the amplitude modulated signal which has the same frequency component $f_p$ as the frequency of the sensing oscillator. The amplitude modulated waveform at the outputs of the detectors 68a, 68b and 68c is sampled at the timing that the amplitude of the sensing waveform is maximum, and that amplitude is zero, as shown in FIG. 18. The sampling is performed by the sampling circuits 70a, 70b and 70c, respectively, utilizing the sampling pulses provided by the timing signal generator 72. The sampled information from the outputs of the sampling circuits 70a, 70b and 70c is applied to the control circuit 74. In FIG. 18, the waveform (a) shows the sensing waveform at the output of the sensing oscillator 46, the waveform (b) is the timing pulse for the sampling at the output of the timing signal generator 72, the waveforms (c), (d) and (e) show the outputs of the detectors 68a, 68b and 68c, and the sampled values of the same.

The control circuit 74 determines the control of the phase shifter 32 so that the interference waves are combined in the opposite phases and are cancelled by each other, utilizing the outputs of the sampling circuits 70a, 70b and 70c. Thus, the frequency characteristics of the combined signal can become flat.

Figure 17B:
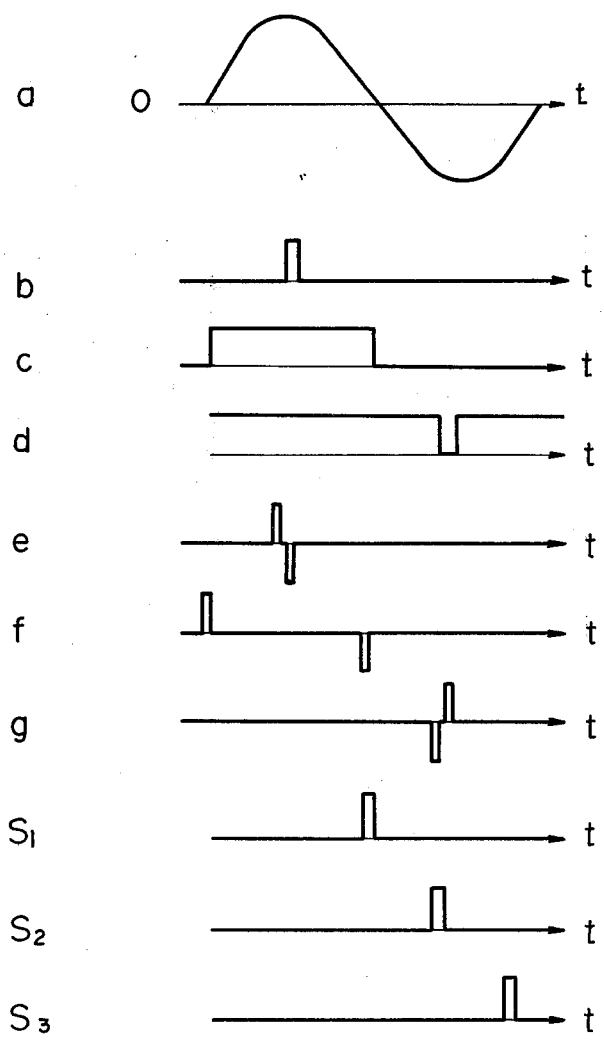
FIG. 17B shows the operational waveforms in the timing signal generator shown in FIG. 17A.

The 17A shows the block diagram of the timing signal generator 72, and FIG. 17B shows the operation of the same. In FIG. 17A, the reference symbols 72a, 72b and 72c are level comparators each of which receives the reference level $+V_{ref}$, zero(0), and $-V_{ref}$ respectively. The level of $+V_{ref}$ and $-V_{ref}$ are the same as the peak voltage of the positive and negative values of the sensing waves. The input (IN) of the comparators is connected to the output of the sensing oscillator 46 (FIG. 16), and receives the sensing waveform as shown in the waveform (a) of FIG. 17B. Then, the outputs of the comparators 72a, 72b and 72c are shown in the waveforms (b), (c) and (d) respectively in FIG. 17B. The outputs of the comparators are applied to the differential circuits 72d, 72e and 72f the output waveforms of which are shown in the waveforms (e), (f) and (g) of FIG. 17B. Then, the outputs of the differential circuits are applied to the rectifiers 72g, 72h and 72i which derive only the positive value of the differential signals. The inverter 72j is inserted between the differential circuit 72e and the rectifier 72h. Therefore, the outputs of the rectifiers 72g, 72h and 72i are shown in the waveforms $S_1$, $S_2$ and $S_3$ of FIG. 17B. It should be appreciated that the sampling pulses $S_1$, $S_2$ and $S_3$ appear when the instantaneous level of the output of the sensing oscillator 46 is positive peak value, zero(0), and negative peak value.

Figure 18A:
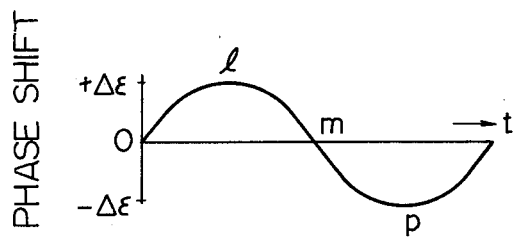
Figure 18B:
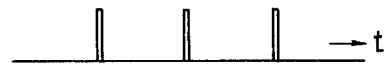
Figure 18C:
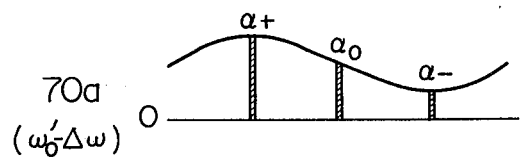
Figure 18D:
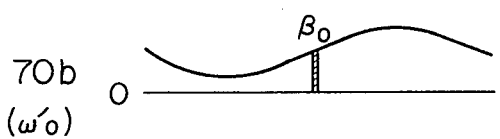
Figure 18E:
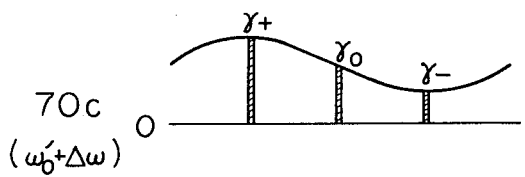
Figure 19:
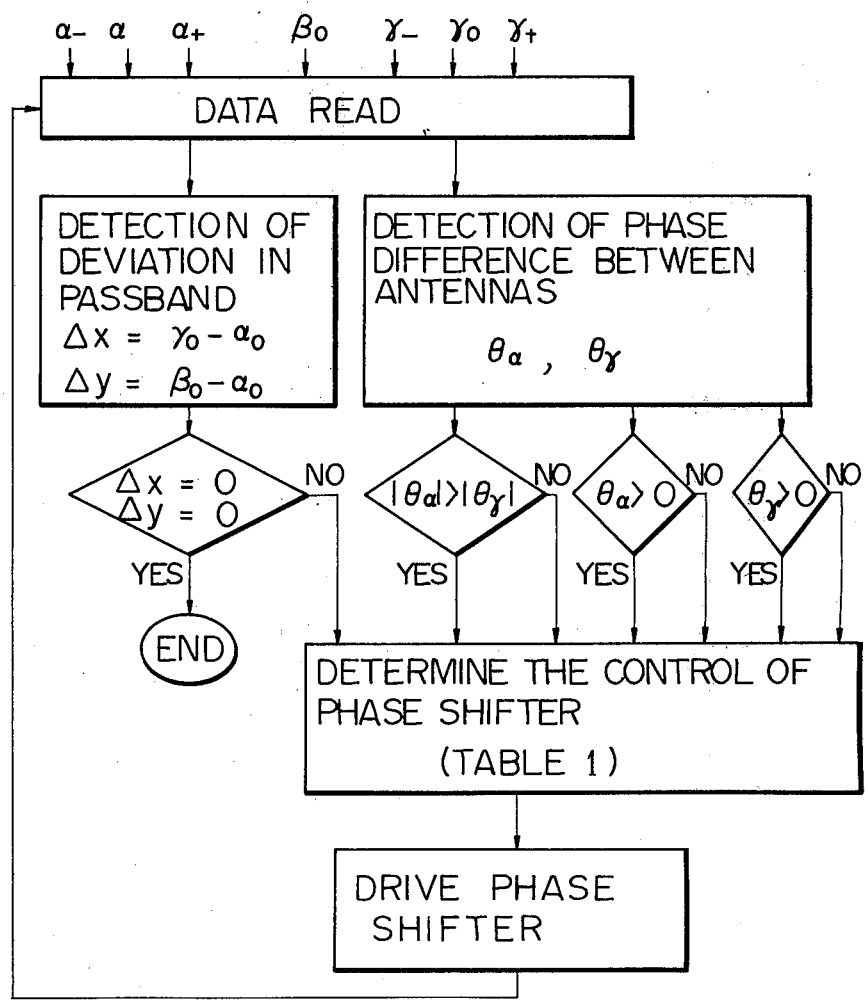
FIG. 19 shows the flow chart showing the operation of the signal processor 74 in the apparatus in FIG. 16 and FIG. 20A and FIG. 20B are the block diagram of the control circuit in the fourth embodiment of the present invention.

The sampling circuits 70a, 70b and 70c have sample-hold amplifiers (SHA) as shown in FIG. 17C. The output of the detector 68a is sampled by the sampling pulses $S_1$, $S_2$ and $S_3$ in the sample-hold-amplifiers in the sampling circuit 70a, as shown in FIG. 18(c). The output of the detector 68b is sampled by the sampling pulse $S_2$ in the sample-hold-amplifier in the sampling circuit 70b, as shown in FIG. 18(d). And the output of the detector 68c is sampled by the sampling pulses $S_1$, $S_2$ and $S_3$ in the sample-hold-amplifiers in the sampling circuit 70c as shown in FIG. 18(e). The sampled values $(\alpha+, \alpha_o, \alpha-, \beta_o, \gamma+, \gamma_o, \gamma-)$ in FIG. 18 are applied to the control circuit 74.

Now, the direction of the control of the phase shifter 32 by the control circuit 74 will be described.

(a) Estimation of the phase difference between signals in each antennas

From the sampled values at the sensing phases l, m and p in FIG. 18(a), the phase difference of two input signals $e_1'$ and $e_2'$ at the inputs of the combiner 4, or the phase difference between antennas, is shown below.

The phase difference at the frequency $(\omega_o' - \Delta\omega)$;

$$\theta_\alpha = n\pi - \tan^{-1}\left[\left(\frac{1+\delta_\alpha}{1-\delta_\alpha}\right) \tan\frac{\Delta\epsilon}{2}\right] \quad (19)$$

The phase difference at the frequency $(\omega_o' + \Delta\omega)$;

$$\theta_\gamma = n\pi - \tan^{-1}\left[\left(\frac{1+\delta_\gamma}{1-\delta_\gamma}\right) \tan\frac{\Delta\epsilon}{2}\right] \quad (20)$$

where $$\delta_\alpha = (\alpha_+^2 - \alpha_0^2)/(\alpha_0^2 - \alpha_-^2),$$
$$\delta_\gamma = (\gamma_+^2 - \gamma_0^2)/(\gamma_0^2 - \gamma_-^2) \quad (21)$$

$\Delta\epsilon$; the maximum phase dispersion angle of the sensing, and n; an integer satisfying $-\pi < \theta_\alpha < 0$ (when $\alpha+ > \alpha-$), or $0 < \theta_\alpha < \pi$ (when $\alpha+ < \alpha-$). The same relation is satisfied for $\theta_j$.

(b) level dispersions $\Delta x$ and $\Delta y$ in the passband

The level dispersions $\Delta x$ and $\Delta y$ defined by the formulae (17) and (18) are given by the following formulae from the sensing detector output shown in FIG. 18.

$$\Delta x = \gamma_o - \alpha_o, \quad \Delta y = \beta_o - \alpha_o \quad (22)$$

(c) Determination of the direction of the control of the phase shifter 32

When $\Delta x \neq 0$, $\Delta y \neq 0$, the polarity of $\Delta x$ and the value (b) are substituted into the formula (17), and then the direction of the control of the phase shifter 32 is determined as shown in the table 1, in the phase shifter 32 controls so that the interference waves are cancelled by each other $(\Delta\psi \to 0)$.

TABLE 1

| | | (direction of control of a phase shifter) | | | | | | | |
|---|---|---|---|---|---|---|---|---|---|
| Frequency | | $-\Delta\omega$ | $+\Delta\omega$ | $-\Delta\omega$ | $+\Delta\omega$ | $-\Delta\omega$ | $+\Delta\omega$ | (r < 1) $-\Delta\omega$ | $+\Delta\omega$ |
| Polarity of phase difference between antennas | | $\theta_\alpha<0$ | $\theta_\gamma>0$ | $\theta_\alpha>0$ | $\theta_\gamma<0$ | $\theta_\alpha<0$ | $\theta_\gamma<0$ | $\theta_\alpha>0$ | $\theta_\gamma>0$ |
| $\Delta x > 0$ | $\|\theta_\alpha\| > \|\theta_\gamma\|$ | + | − | | | + (108c) | − | | |
| | $\|\theta_\alpha\| < \|\theta_\gamma\|$ | (108a) | | | | − | + (108d) | | |
| $\Delta x < 0$ | $\|\theta_\alpha\| > \|\theta_\gamma\|$ | | | − | + | | | − | + (108f) |
| | $\|\theta_\alpha\| < \|\theta_\gamma\|$ | | | | + (108b) | | + (108e) | | − |

Note:
If r > 1, the direction of control of a phase shifter for cancelling the interference waves is the opposite direction of that shown in the Table 1.

That is to say, the direction of the control of a phase shifter is defined according to the relationship of the values of the sensing detector outputs, the phase difference $\theta_\gamma$ and $\theta_\alpha$ between antennas, and the polarity of the level dispersion in the pass-band, as shown in the Table 1, and the interference waves are cancelled with each other when the frequency characteristic become flat.

Since the Table 1 shows the case that $r<1$, when $r>1$, the direction of the control is reversed. It is difficult generally to determine $r<1$ or $r>1$, so that control according to the Table 1 irrespective the value of (r), the main wave would be cancelled when $r>1$. However, that situation is no matter and is acceptable, since the amplitude of the interference wave is larger than that of the main wave.

Figures 20, 20A, 20B:
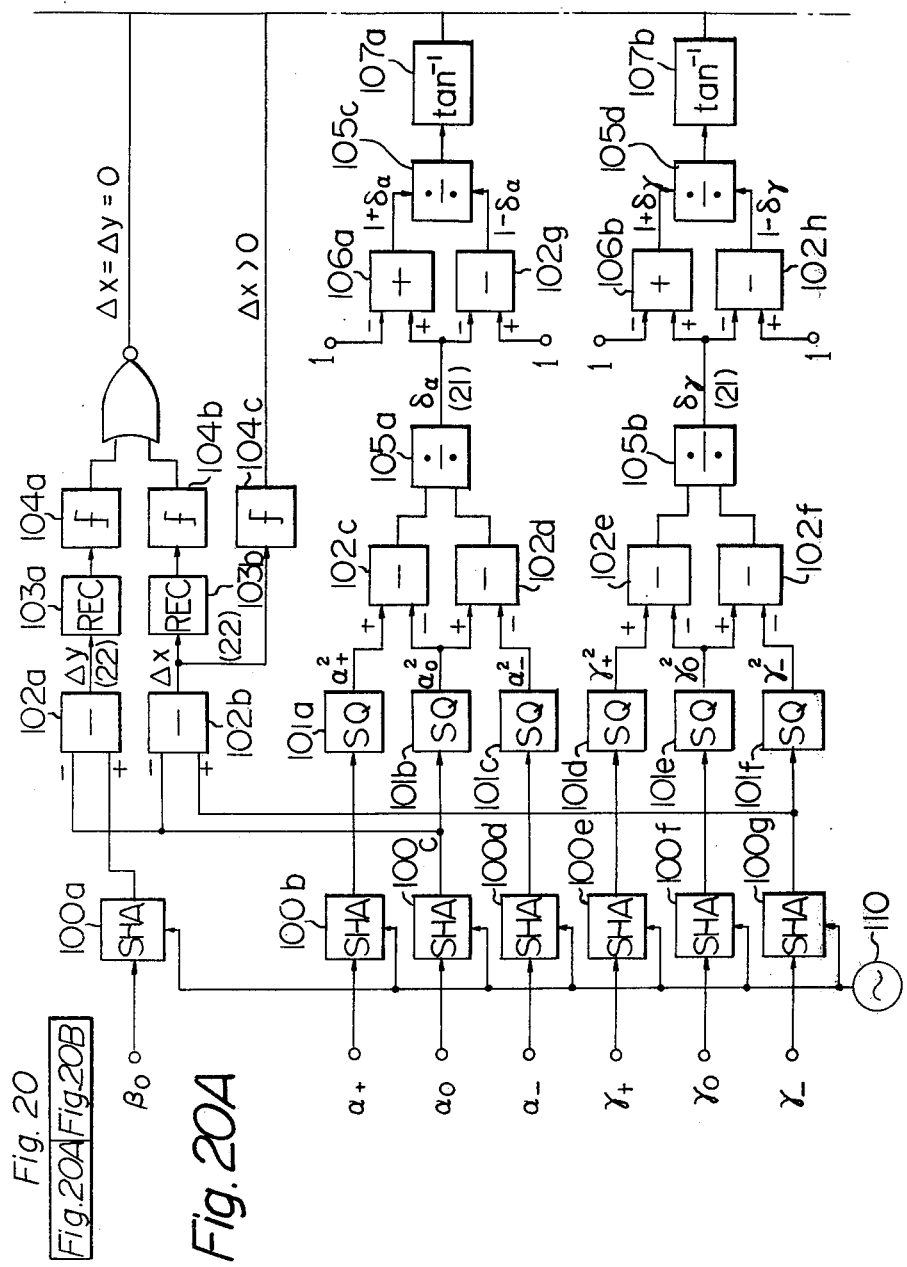

The operation in the signal processor 74 for the determination of the direction of the control of the phase shifter as described above is shown in FIG. 19 and the operation of FIG. 19 is performed by either a programmed computer, or a hardware circuit as shown in FIG. 20.

In FIG. 20, the reference numerals 100a through 100g are sample hold circuits which holds the input values in the drawing. 101a through 101f are square circuit, 102a through 102h are a subtractor, 103a through 103d are a fullwave rectifier, 104a through 104f are a detector which provides an output signal when an input signal exceeds a predetermined level, 105a through 105d are a divider, 106a and 106b are a divider, 107a and 107b are an arc-tangent circuit, 108a through 108f are an AND circuit, 109a and 109b and an OR circuit, and 110 is a clock circuit for providing the timing signal to a sample hold circuit.

In FIG. 20, it should be appreciated that the subtractor 102a provides $\Delta y$ shown in the formula (22), the subtractor 102b provides $\Delta x$ shown in the formula (22), the divider 105a provides $\delta_\alpha$ shown in the formula (21), the divider 105b provides $\delta_\gamma$ shown in the formula (21). Then, the OR circuit which is substantially an AND circuit because of the presence of the inverter at the output of the same, provides the output signal when $\Delta x = \Delta y = 0$, and that situation means that the interference wave is completely cancelled and so the instruction signal for stopping the control of the phase shifter is provided through the output terminal 111a.

Also, it should be appreciated that the circuit 107a provides $\theta_\alpha$ shown in the formula (19), and the circuit 107b provides the value $\theta_\gamma$ shown in the formula (20). Accordingly, the detector 104c provides the output signal when $\Delta x > 0$, the detector 104d provides the output signal when $\theta_\alpha > 0$, the detector 104e provides the output signal when $\theta_\gamma > 0$, and the detector 104f provides the output signal when $|\theta_\alpha| > |\theta_\gamma|$.

The AND circuits 108a through 108f perform the logical calculation according to the Table 1 utilizing the output signals of the detectors 104c through 104f. For instance the AND circuit 108a provides the output signal when $\Delta x > 0$, $\theta_\alpha < 0$ and $\theta_\gamma > 0$, and in this situation an output signal is provided at the output terminal 111b to control the phase shifter so that the phase becomes lag. The situation that each AND circuit provides an output signal is shown in the Table 1 with the same reference numeral as the corresponding one in FIG. 20 with the parenthesis. When the output terminal 111b does not provides an output signal, the output terminal 111c which has an inverter 112 between the terminals 111b and 111c provides the output signal, and that output signal instructs the lead phase to the phase shifter.

As mentioned above in detail, the present invention can cancel the interference waves which cause the amplitude dispersion and/or the delay deviation in the pass-band, and provide the flat amplitude characteristics and the flat delay characteristics.

In a wide band digital transmission system utilizing a microwave band, the error rate is considerably deteriorated because of the wave form distortion due to the amplitude deviation and/or the delay dispersion in the passband. Also, in a microwave band SSB system (single side band) in which a multiplexed FDM (frequency division multiplexed) signal is modulated through an SSB-AM (single side band-amplitude modulation), the level dispersion in the passband due to fading affects directly the fluctuation of received signal thus the transmission band must be severely limited. The present invention is preferable for that purpose.

The space diversity reception system according to the present invention cancels the interference waves with each other and suppresses the amplitude or phase dispersion in the pass-band, and is beneficial for the improvement of the transmission quality in a wideband digital and/or analog transmission system through a multipath fading channel.

From the foregoing, it will now be apparent that a new and improved space diversity reception system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A space diversity reception system comprising a pair of spaced antenna means, a phase shifter means connected to a first one of said antenna means for shifting the phase of signal received by said first antenna means, a combiner connected to the outputs of said first and second ones of the said antenna means, and control means for the control of said phase shifter means, wherein said control means controls said phase shifter means so that the phase of an interference wave received by said first antenna means is opposite at the input of said combiner to that received by said second antenna means, and interference waves of said pair of antenna means are cancelled by each other wherein said control means comprises a first level detector for detecting the level {b} at a first input of said combiner at a center frequency {$\omega_o$} of a passband, a second level detector for detecting the level {a} at a second input of said combiner at the center frequency {$\omega_o$}, a third level detector for detecting levels {c, d} at the output of said combiner at both the extreme end frequencies of the passband {$\omega_o - \Delta\omega$ and $\omega_o + \Delta\omega$}, a first subtractor for providing the difference {a−b} between the outputs of said first level detector and said second level detector, a second subtractor for providing the difference {d−c} between two outputs of said third level detector, and a logic circuit having a plurality of AND circuits connected to the outputs of said two subtractors for providing a control signal for said phase shifter means.

2. A space diversity reception system according to claim 1 wherein said control means controls said phase shifter means so that the amplitude and phase dispersion in the pass band is minimized.

3. A space deversity reception system according to claim 1, wherein said logic circuit provides a first output for increasing the phase shift of said phase shifter when a-b>0, and d-c<0 are satisfied, and a-b<0, and d-c>0 are satisfied, and said logic circuit provides a second output for decreasing the phase shift of said phase shifter means when a-b<0, and d-c<0 are satisfied, and a-b>0, and d-c>0 are satisfied.

4. A space diversity reception system comprising a pair of spaced antennas, a phase shifter means connected to a first one of the antennas for shifting phase of the a signal received by said first antenna, phase modulating means connected to a second one of the antennas a combiner connected to the output of said phase shifter means and the output of said phase modulating means, a detector connected to the output of said combiner for providing a detected high speed digital signal, and a regenerator coupled to the output of said detector for the recognition of a digital symbol and for providing the output of said reception system, control means for the control of said phase shifter means wherein said control means comprises a sensing oscillator coupled to said phase modulating means for modulating one said second antenna output, a distortion detector connected to the input and output of said regenerator for providing an output signal representing distortion of received signals, and a synchronization detector coupled to said sensing oscillator and distortion detector for controlling said phase shifter means according to the phase difference between the output of said sensing oscillator and the output of said distortion detector, and wherein said control means controls said phase shifter means so that the phase of an interference wave received by said first antenna is opposite at the input of said combiner to that received by said second antenna, and interference waves of said antennas are cancelled by each other.

5. A space diversity reception system according to claim 4 wherein said distortion detector comprises a subtractor means for providing a difference signal related to the input signal and the output signal of said regenerator, a sampling circuit connected to the output of said subtractor for sampling the output signal of said subtractor only at a sampling time, and a series circuit of a rectifier and a low pass filter connected to the output of said sampling circuit for providing the distortion output signal.

6. A space diversity reception system according to claim 4, wherein said distortion detector comprises a pattern detector connected to the output of said regenerator for detecting a predetermined pattern at the output of the regenerator, a comparator for comparing the output of said pattern detector with the distorted signal of the input of the regenerator and a low pass filter connected to the output of said comparator for providing the distortion output.

7. A space diversity reception system according to claim 4 wherein said distortion detector comprises a second regenerator the input of which is responsive to a combination of the input of the first regenerator and the output of a noise generator, an Exclusive-OR circuit for providing an Exclusive-OR logic error pulse from the outputs of said first and second regenerators, a counter for counting the number of error pulses provided at the output of said Exclusive-OR circuit, and a digital-to-analog converter connected to the output of said counter for providing the distortion output signal.

8. A space diversity reception system according to claim 4 wherein said distortion detector comprises a second regenerator connected to the same input as that of the first regenerator, an Exclusive-OR circuit for providing an Exclusive-OR logic from the outputs of said two regenerators to provide an error pulse, a counter for counting the number of error pulses provided at the output of said Exclusive-OR circuit, and a digital-to-analog converter connected to the output of said counter for providing the distortion output signal.

9. A space diversity reception system according to claim 4 wherein a second chamber is provided for combining the antenna outputs, wherein said control means controls said phase shifter means according to the output of said second combiner.

10. A space diversity reception system comprising a pair of spaced antennas, a phase shifter means connected to a first one of said antennas for shifting the phase of a signal received by said first antenna, a combiner connected to the output of said phase shifter means, phase modulating means including a sensing coupled to a second one of said antennas oscillator for phase modulating a signal received by said second antenna, said combiner also coupled to the output of said phase modulating means and control means for the control of said phase shifter means wherein said control means comprises a plurality of level detectors connected to the output of said combiner for providing levels at a plurality of frequency points in a reception pass-band, and a control circuit for controlling said phase shifter means according to the output of said level detectors and wherein said control means controls said phase shifter means so that the phase of an interference wave received by said first antenna is opposite at the input of said combiner to that received by said second antenna, and interference waves of said antennas are cancelled by each other.

11. A space diversity reception system, according to claim 10, wherein said plurality of level detectors comprises two level detectors connected to the output of said combiner for providing the levels at the extreme edges of the pass-band, a subtractor for producing an amplitude dispersion of said combiner output signal, and a fullwave rectifier for producing the absolute value of said amplitude dispersion.

12. A space diversity reception system according to claim 10, wherein said plurality of level detectors comprises three level detectors connected to the output of said combiner for providing three levels at the center and extreme edges of the pass-band, and wherein said control means further includes a timing generator connected to said sensing oscillator for generating three timing signals triggered at the time when said sensing oscillator output signal has the level of positive and negative peaks, three sample and hold circuits connected to the output of said level detectors and driven by said timing generator output signals for providing the sampled values of said level detector outputs, sample and hold amplifiers, subtractor circuit means connected to the output of said sample and hold amplifiers, arctangent circuit means coupled to the output of said subtractor circuit means and gate circuit means coupled to the output of said arctangent circuit means for providing the phase shifter control direction information from the output signal of said sample and hold circuits.

* * * * *